United States Patent [19]

Gauthier et al.

[11] 4,118,618

[45] Oct. 3, 1978

[54] DEVICE FOR WELDING OPTICAL FIBRES END TO END

[75] Inventors: Francis Gauthier, Oullins; Georges Mignien, Meyzieu, both of France

[73] Assignee: Les Cables de Lyon, Lyon, France

[21] Appl. No.: 786,950

[22] Filed: Apr. 12, 1977

[30] Foreign Application Priority Data

Apr. 14, 1976 [FR] France .................. 76 10971

[51] Int. Cl.² ............................. B23K 9/00
[52] U.S. Cl. .......................... 219/121 P; 219/121 R; 65/4 A; 65/152; 65/DIG. 7; 156/502; 156/158; 350/96.20
[58] Field of Search ........ 219/121 P, 121 R, 121 LM; 350/96 R, 96 B, 96 WG; 156/158–304, 502, 82; 65/152, DIG. 7, 155, 4 R, 4 A

[56] References Cited

U.S. PATENT DOCUMENTS

| 3,783,065 | 1/1974 | Stone | 156/158 |
| 3,794,806 | 2/1974 | Klasson | 219/121 P |
| 3,816,087 | 6/1974 | Van Dooren et al. | 65/152 X |
| 3,825,319 | 7/1974 | Cook et al. | 350/96 R |
| 3,919,037 | 11/1975 | Miller | 156/158 X |
| 3,960,531 | 6/1976 | Kohanzadeh et al. | 65/152 X |
| 4,032,382 | 6/1977 | Obeda | 156/158 |

*Primary Examiner*—C. L. Albritton
*Assistant Examiner*—M. Paschall
*Attorney, Agent, or Firm*—Haseltine, Lake & Waters

[57] ABSTRACT

A welding device for joining optical fibres together with a low loss joint. It comprises a microplasma blow torch with central and tubular electrodes and central and peripheral nozzles supplied with pure and hydrogenated argon. The torch is used in conjunction with a clamping frame for aligning the fibres and holding them in position during welding.

2 Claims, 8 Drawing Figures

DEVICE FOR WELDING OPTICAL FIBRES END TO END

The present invention relates to a device for end to end welding of optical fibres and in particular a device aiming to produce one fibre from two or several sections of fibre having almost the same diameter.

Optical fibres can be monomode or multimode, having various refractive index profiles (e.g. step or graduated) and can be made diverse materials (compound glass, doped glass).

For example, glass fibres having a step refractive index profile can be constituted by a glass core with glass cladding having an outside diameter of a hundred or so microns. The refractive index of the core is higher than that of the cladding, due to their relative composition, this providing at the interface total reflection of the light rays which pass through the core. For example, to repair a fibre broken during cladding or cabling, longitudinal continuity of the two cores and of the two claddings must be provided. For this purpose, the sections to be connected together are prepared and must be plane and perpendicular to the axis of the fibre. The fibres are then alined and pressed lightly against one another and are welded at the joint.

In accordance with a prior known technique, a device using a metal wire (e.g. platinum, nickel-chrome steel, etc.) which forms a heating zone round the zone to be welded is used to weld conventional compound glass wires. However, this technique does not make it possible to weld silica fibres whose softening temperature is too high to be reached with this device.

Present devices enable two optical fibres to be joined together end to end, each end being gripped by clamps, using a set of micromanipulators; the ends of the fibres to be joined together end to end are positioned, this position being checked by highly magnifying optical projections or by binocular microscope. One disadvantage of these devices is that they require independent treatment of each fibre.

The device according to the present invention mitigates these disadvantages. The device enables the fibres to be positioned, welded and removed after welding in layers.

The invention provides a device for end to end welding of a plurality of optical fibres disposed in a layer, each fibre comprising a bared part and a covered part supported by a positioning block, the bared part of the fibre being disposed in a positioning groove and the covered part of the fibre being clamped in a support, the ends of the bared parts of the fibres being adjacent to each other for welding, wherein said device comprises means for moving a microplasma blow torch used for the welding operation, said blow torch having its vertical axis above said ends to be welded of the layer of fibres perpendicularly to these fibres, said positioning block comprising a plurality of said parallel positioning grooves with rounded side surfaces, the bottom of the groove communicating with a small diameter bore running parallel to said groove, said positioning block comprising a slot below the weld line and intersecting each of said positioning grooves in its middle, this slot communicating with a large void for receiving the plasma gas, and wherein said support of said covered parts comprises two multiple clamps on either side of said positioning grooves in the axis of the fibres which are capable of moving with said covered parts which pre- position the fibres in relation to said grooves and positioning the ends of said bared parts adjacent to each other.

The present invention makes it possible to reach the required temperatures for welding silica fibres. Further, it is possible to provide sufficient physical and mechanical continuity of the fibres to bring about only a negligible attenuation of light at the weld due to the accurate setting up of the weld conditions.

The plasma may be blown outside of the blow torch while forming it through a first nozzle.

The plasma blow torch preferably comprises a second outside nozzle through which suitably dosed hydrogenated argon is injected. The reducing medium thus provided by the second nozzle then makes it possible to control the oxidation of the electrodes which is a great source of pollution of the glass to be welded and to prevent erosion of these electrodes as this would result in unstable welding conditions.

Other characteristics and advantages of the invention will become apparent from the detailed description of some embodiments made by way of example with reference to the accompanying drawings in which.

Figure 1:
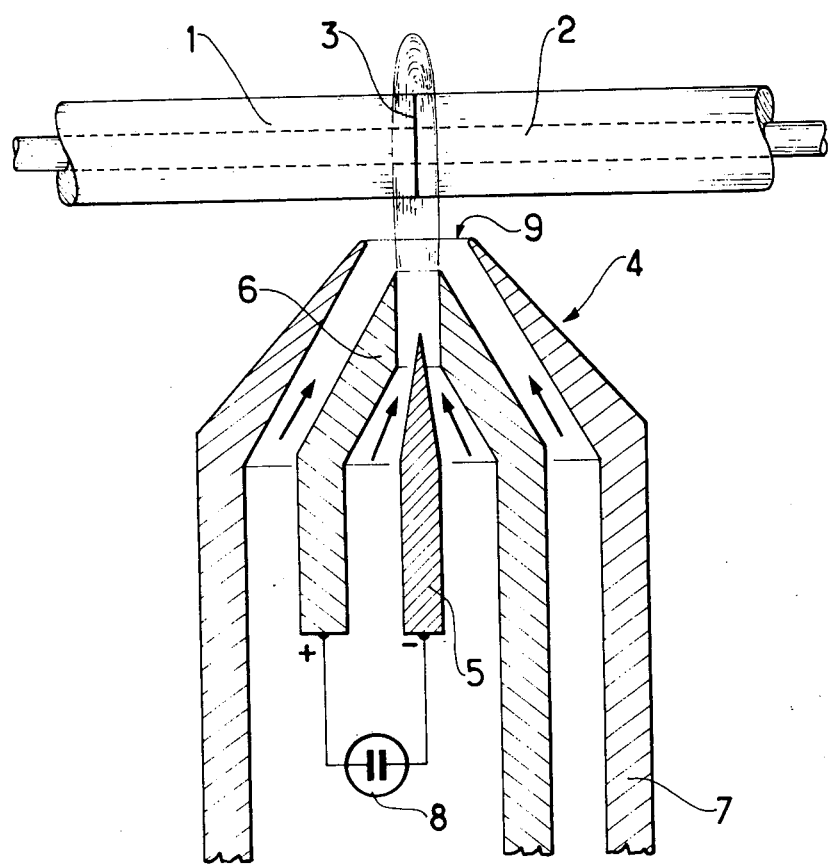
FIG. 1 is a schematic cross-section of a microplasma blow torch disposed adjacent to a joint between two optical fibres.

In FIG. 1, a blow torch consists of a central negative electrode 5 ending in a point which projects into the end of a first electrolytic copper nozzle 6 forming the positive electrode but which does not touch it. A second nozzle 7 is disposed concentrically to the first nozzle 6. The plasma is ionized by an electric arc formed between the two electrodes by an electric current source 8. A very pure neutral gas such as argon (argon N 55) is injected into the inner nozzle 6. The arc is established firstly between the electrode 5 and the inside of the nozzle. It is then blown outside under the effect of the argon flow through the nozzle 6 and thus generates a plasma.

A second gas consisting of hydrogenated argon which focusses the arc is injected into the second nozzle 7. Hydrogen ionized at the temperature of the arc recombines on the part to be welded, giving off heat; (also hydrogen, which is a reducing gas, protects the weld zone against oxidation). The use of the second peripheral gas makes it possible to control welding conditions.

Misalinement of the fibres to be welded due to the gas flows is avoided by the use of a nozzle 6 with a diameter of the order of one millimeter and by controlling the gas discharge rates precisely. The gas discharge of the nozzles lies between a few cubic centimeters per hour and a few tens of thousands of cubic centimeters per hour. The arc ejected has a visible axial length of a few millimeters.

Fibres 1 and 2 are alined and are then placed in mechanical contact at a controlled low contact pressure, the joint being referenced 3. The opening 9 of the microplasma blow torch 4 is initially kept away from the plane of the joint 3.

Firstly, the plasma is generated outside the plane of the joint 3 of the two fibres. Then the opening 9 of the blow torch 4 is moved to bring the plasma closer into the plane of the joint 3 of the two fibres, at a distance of a few fractions of a millimeter from the joint. The welding time is very short and does not exceed ten seconds. The fibre softened by heating does not have the time to become deformed under the effect of gravity. Bending is prevented at the joint because the draft from the plasma is reduced to a minimum.

A weld made with a microplasma blow torch causes an additional loss of light of the order of 0.2 dB or less in the resulting fibre.

It makes it possible to obtain a continuous outside diameter while enjoying the mechanical advantages of welding (without the addition of any material).

Figure 2:
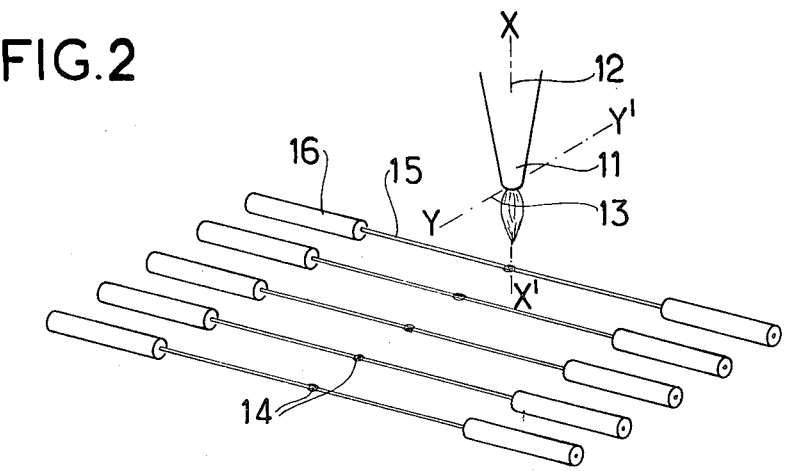
FIG. 2 shows schematically the device with a layer of fibres and the blow torch for welding.

FIG. 2 shows schematically the device in which a microplasma blow torch 11 has its vertical axis XX' 12 and moves along a horizontal axis YY' 13. The plane of movement of the blow torch 11 is the plane containing the axes XX' and YY'. The welds 14 to be made are in the aforementioned plane. The optical conductors 15 are bared by removal of a plastics material covering 16. The arc is struck and controlled behind (as seen in the figure) the horizontal layer of fibres to be welded and the arc moves at a constant speed above each joint. Welding may be intermittent or non-stop on the axis of the fibres.

Figure 3:
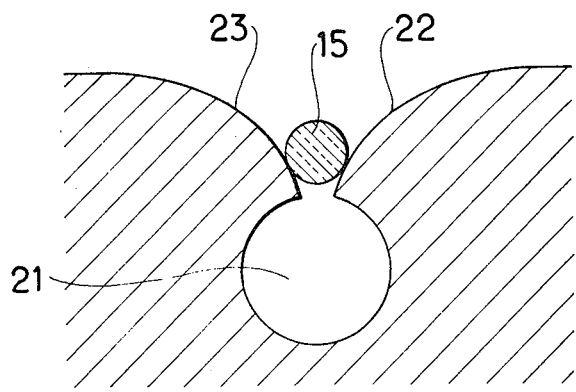
FIG. 3 is an enlarged cross-section of the positioning groove.

FIG. 3 is a cross-section of a positioning groove 23 which has a small-diameter bore 21 running parallel to and communicating with the apex of the grooves. The bore 21 facilitates the machining and the cleaning of the groove. The groove 23 has rounded fibre pre-positioning surfaces 22 to facilitate application of a fibre 15 to the groove 23. This is because the outer opening of the groove is larger than it would be in the case of a V-shaped groove with plane surfaces. Also, the fact of communicating with the bore 21 improves the possibility of cleaning and prevents the deposit of small particles in the bottom of the V.

Figure 4:
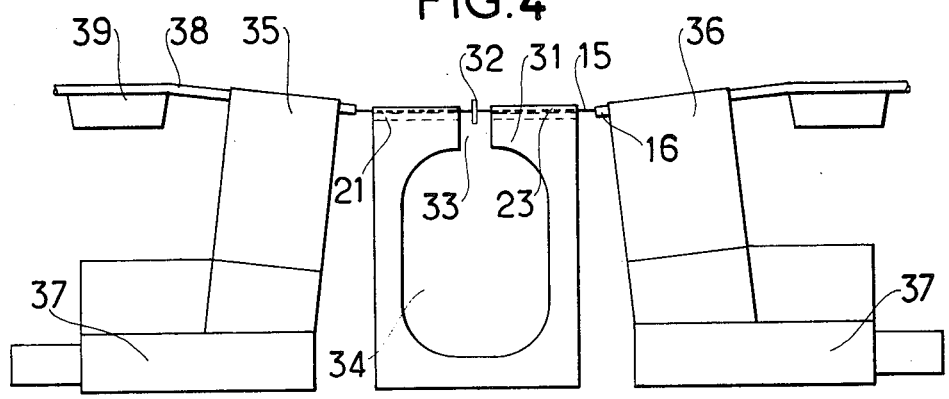
FIG. 4 shows diagrammatically the positioning of the fibres in the support block.

FIG. 4 is a schematic cross-section of a support block 31 carrying a set of positioning grooves 23 on its upper surface. The grooves are transversely cut by a slot 33. The support block 31 has several grooves 23 in the horizontal plane. The transverse slot 33 has a suitable width for making the weld and is formed after the grooves 23 have been machined. The slot 33 allows the microplasma not to be perturbed during welding since it leads to a large void 34 situated under the layer of fibres to be joined together. Due to the inclination of two multiple clamps 35 and 36, the bared parts of the optical conductors 15 can be forced into the bottom of the grooves 23; the multiple clamps 35 and 36 pre-position the fibres 15 in relation to their grooves 23 which is sufficient to guide the corresponding fibre into the V. The multiple clamps are designed to space the fibre at a distance apart lying between twice and five times the diameter of the plastics covering of the fibre. An axially moving slide 37 enables the optical conductors to be moved along their axes, the force being checked by adherence in the multiple clamp. The covered fibres 38 are held by a U-shaped support 39 allowing extraction of the welded fibres in a single movement.

Figure 5:
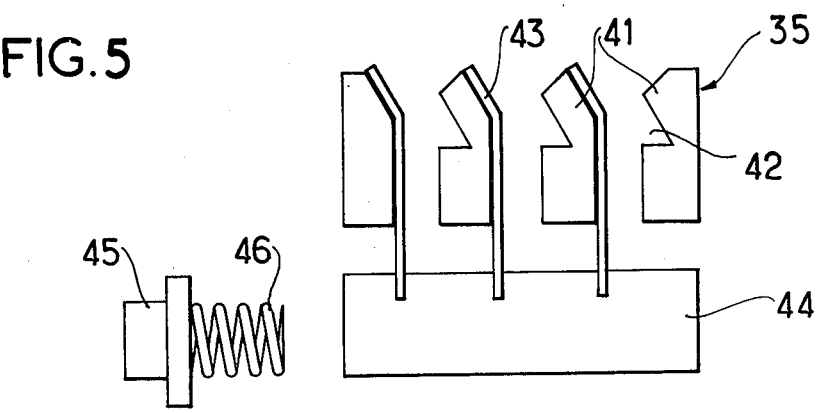
FIG. 5 is a side view of a multiple clamp in the open position.

FIG. 5 is a side view of a multiple clamp in the open position. It is essentially constituted by rigid support plates 41 containing grooves 42, resilient spring blades 43, a sliding plate support 44 generally controlling the assembly formed by the spring blades, a push-button 45 and a tared spring 46. The tared spring 46 controls the linear movement of the plate bearer 44 and enables pressure to be applied to the fibres through the spring blades 43.

In the open position, the blades are the farthest apart from their grooves and allow the covered fibres to enter the grooves. This open position of the multiple clamp is necessary for the extraction of the entire layer upwards after welding.

Figure 6:
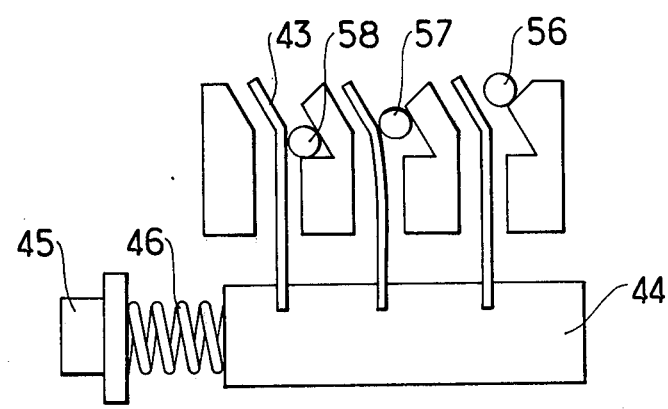
FIG. 6 is a side view of a multiple clamp locked in the sliding position.

FIG. 6 is a side view of a multiple clamp in the sliding position. In this configuration, the push-button 15 is locked in a first position such that the force of the tared spring is small and therefore the pressure on each spring blade 53 is not very great; hence it is possible for the plastics covering of the fibre to slide in the multiple clamp. The covered fibres can be inserted from above by simple movement of the spring blade. In the figure, three positions of the covered fibres are shown: the position 56 shows a fibre before it is inserted; the position 57 shows a fibre being inserted and the position 58 shows a position after insertion.

The slip of the fibre in the axial direction is more or less great depending on the pressure of the spring blade 43 on the fibre in the position 58 in its groove. The pressure of the ends of the fibres is thus controlled at the weld.

Figure 7:
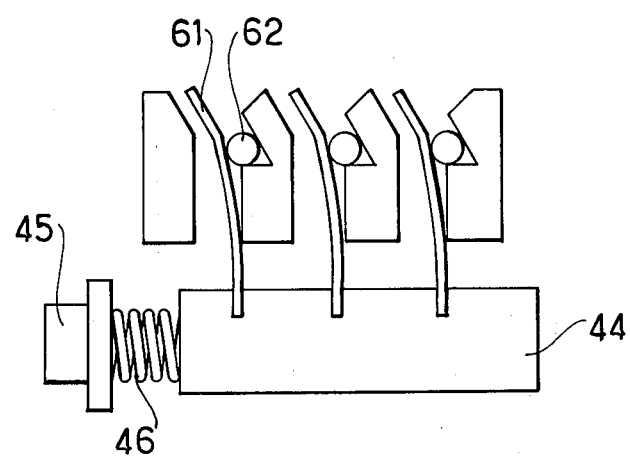
FIG. 7 is a side view of a multiple clamp locked in the blocked position.

FIG. 7 is a side view of a multiple clamp in the blocked position. The push-button 45 is locked in a second position such that the force on the tared spring 46 is great and hence the pressure of each spring blade is large and makes sliding of the plastics covering of the fibre in the multiple clamp impossible. The pressure of the spring blades 43 in the position 61 on the covered fibre in the position 62 is such that there is no possibility of sliding of the covered fibres in their grooves.

FIG. 4 shows a reference plate 32 which is positioned in a first operation instead and in place of the vertical plane of movement of the blow torch between the two V-shaped positioning layers adjacent to the slot 33 which allows the plasma arc to pass. A first layer of fibres is fixed in the multiple clamp 35 for example: the longitudinal position of the fibre is of no importance; it is placed normally, behind the reference plate 32. With the fibres already engaged in the V-shaped positioning grooves 23, the locking means of the multiple clamp in question being in the sliding position, it is possible to move the clamp along an axis parallel to the fibres of the layer. In this movement, the fibres move along their axis until they touch the reference plate 32. When one end of the fibre touches the reference plate 32, the covered fibre slides in relation to the clamp in question of the multiple clamp 35, at the covering. The horizontal movement of the multiple clamp is stopped when all the fibres press against the reference plate 32. The locking means of the multiple clamp 35 are switched to the locking position; thus all the fibres of a layer are positioned by the V-shaped grooves 23 and their ends are positioned axially. Once this operation is ended, the reference plate 32 is retracted.

The second layer of fibre is fixed in the same way as the first, the reference no longer being the plate 32, but the ends of the fibres of the already positioned first layer.

For this second layer, the fibres are placed behind the ends of the fibres of the first layer, the multiple clamp 36 being in the sliding position. The multiple clamp 36 is moved along an axis parallel to the fibres of the layer. The movement of the multiple clamp 36 is stopped when all the fibres abut against the fibres to which they are to be welded.

The fibres are thus positioned with their ends slightly pressed against each other and welding can then begin.

Figure 8:
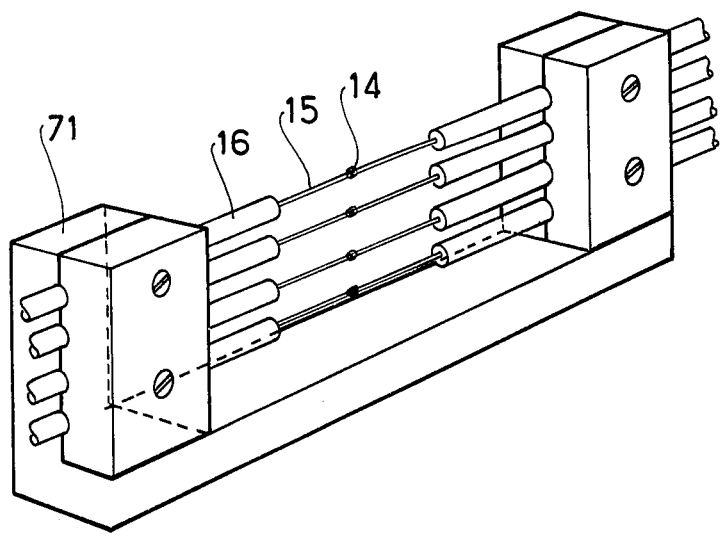
FIG. 8 shows schematically the welded fibres in a U-shaped support.

FIG. 8 shows schematically the welded fibres in the U-shaped support unit. The U-shaped system holds the fibres to be welded beyond and on either side of the multiple clamps, making it possible to remove the two layers of welded fibres in a single block after welding. The welded fibres are maintained by two screwed blocks 71 clamping the covered parts 16 of the fibres. Two side plates can be fixed onto this unit to form a tank in which a not very hard protective resin can be moulded. This assembly is then placed in a sealed connection box.

Applications come within the field of optical fibres used for telecommunications and additionally of all "glass" fibres, whatever their geometrical form may be.

What we claim is:

1. An apparatus for end to end welding of a plurality of optical fibres disposed in a layer, each fibre being formed of a bared part and a covered part supported by a positioning block, the bared part of the fibre being disposed in a positioning groove and the covered part of the fibre being clamped in a support, the ends of the bared parts of the fibres being adjacent to each other for welding, wherein: said device comprises means for moving a microplasma blow torch for welding said fibres, said blow torch having its vertical axis above said ends of the layer of fibres to be welded and being perpendicular to said fibres; said positioning block being formed of a plurality of said parallel positioning grooves being in parallel relation with respect to one another and having rounded side surfaces, each groove having a bottom communicating with a small diameter bore running parallel to said groove, and a slot formed below the weld line intersecting each of said positioning grooves in its middle, said slot communicating with a void for receiving plasma gas, and said support having two multiple clamps on either side of said weld line in the axis of the fibres which are capable of moving with said covered parts and being adapted to preposition the fibres in relation to said grooves and position the ends of said bared parts adjacent to one another each of said multiple clamps being defined by a plurality of support plates containing a groove suitable for the insertion of said covered fibre; a plurality of spring plates suitable for locking said covered fibres, said spring plates being integral with a support plate and controlled by a pushbutton and a tared spring.

2. A welding apparatus according to claim 1, wherein: said spring plates, the sliding support plate and said pushbutton are disposed in three positions corresponding to an open position, a position allowing the fibres to slide a position for blocking the fibres.

* * * * *